Figure 1:
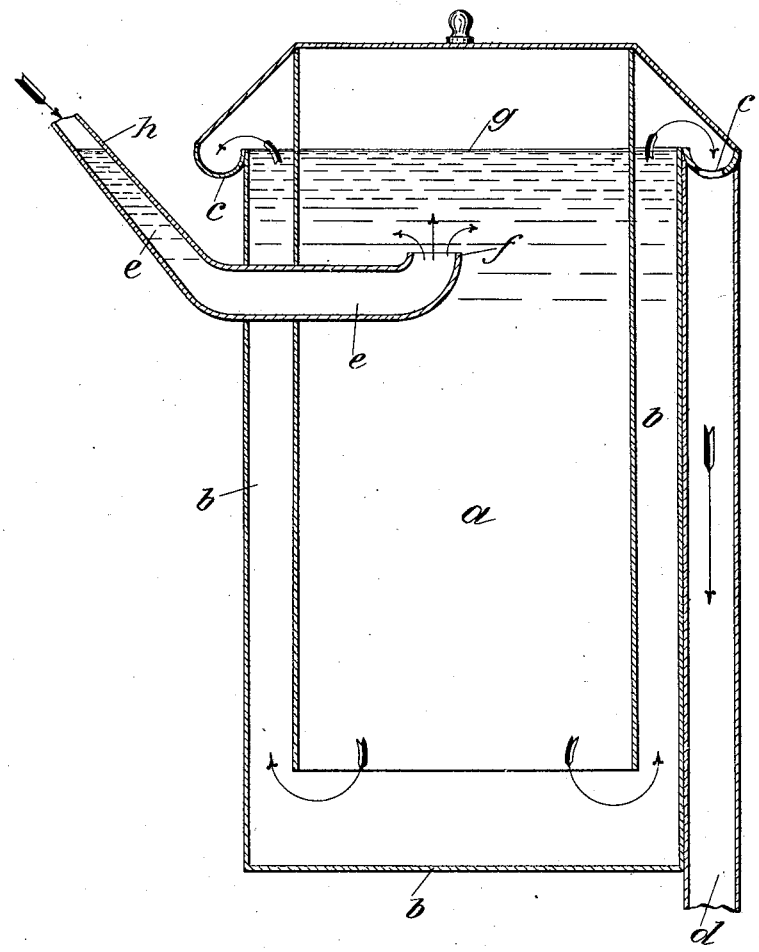

No. 700,056. Patented May 13, 1902.
C. KREMER.
APPARATUS FOR THE RECOVERY OF FATS OR THE LIKE.
(Application filed Aug. 26, 1901.)

(No Model.) 3 Sheets—Sheet 1.

No. 700,056. Patented May 13, 1902.
C. KREMER.
APPARATUS FOR THE RECOVERY OF FATS OR THE LIKE.
(Application filed Aug. 26, 1901.)
(No Model.) 3 Sheets—Sheet 2.

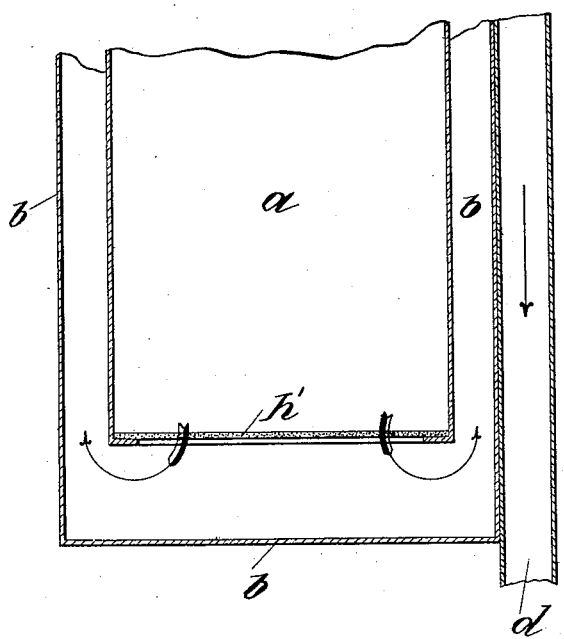

UNITED STATES PATENT OFFICE.

CHRISTOPH KREMER, OF WIESBADEN, GERMANY.

APPARATUS FOR THE RECOVERY OF FATS OR THE LIKE.

SPECIFICATION forming part of Letters Patent No. 700,056, dated May 13, 1902.

Application filed August 26, 1901. Serial No. 73,292. (No model.)

*To all whom it may concern:*

Be it known that I, CHRISTOPH KREMER, a subject of the King of Prussia, residing at Wiesbaden, in the Kingdom of Prussia, Germany, have invented certain new and useful Improvements in Apparatus for the Recovery of Fats or the Like, of which the following is a specification.

This invention relates to apparatus for the recovery of fats and the like.

The invention is based upon the well-known physical fact that water poured into communicating vessels rises to the same level in all such vessels. If some fluid fat be poured into one of these communicating vessels when partly filled with water, the fat will collect on the surface of the water in the vessel into which it is being poured; but if the communication between the vessels is below the level of the fat no fat will pass into the communicating vessels in which the level of the water will rise correspondingly. If the walls of the vessels communicating with the vessel into which the fat is poured be not higher than the level of the water therein, the water therein will overflow when fat is poured into one vessel having a higher wall than the others, and the weight of water overflowing the sides of the communicating vessels will be equal to that of the fat poured into the receiving vessel. Now if instead of fluid fat water mixed with fat—for instance, dish-water—be poured into the tall vessel the result will be the same. The fat contained in the dish-water will rise to the surface of the vessel into which the dish-water has been poured, and the water freed from fat will pass to and run over the walls of the communicating vessel or vessels, provided the former be lower than the latter.

In carrying out my invention I cause water containing fat and the like, such as dish-water, to flow upwardly into a vessel communicating with one or more other vessels, separating the fat in the vessel into which the dish-water has been poured, and drawing off the water freed from the fat into one or more vessels communicating with the first vessel in such a manner that the water before it escapes must rise in the vessel or vessels communicating with the first vessel.

The apparatus requires a very small space and requires no attention, except for the very easy removal of the fat and the periodical cleaning of the apparatus. The fat has time to set, so as to form a disk or cake which can be easily removed. Further, as the fat congeals in a position of rest the fine oils used largely in hotels and other establishments can be conveniently recovered, because they will be found inclosed as drops in the rigid fat. This recovery of fine oils is facilitated by the fact that the specific gravity thereof is between those of the various kitchen fats.

Figure 2:
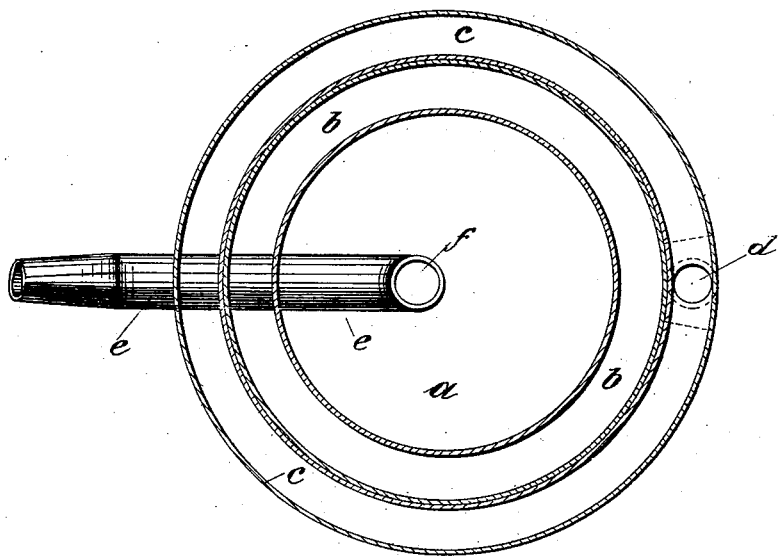

In the accompanying drawings, which illustrate my invention, Figure 1 is a vertical sectional elevation of the apparatus. Fig. 2 is a transverse section thereof just above the channel $c$; and Fig. 3 is a detail vertical section thereof, illustrating a filter at the bottom of the inner vessel.

In said drawings, $a$ is the vessel for the reception of the dish-water. $b$ is a vessel communicating with the former and surrounding it, so as to leave an annular space of about five centimeters between the walls.

In order to prevent the formation of a strong current in the vessel $a$ toward the vessel with which it communicates and in the latter vessel toward the overflow, the two vessels communicate with each other around the whole periphery of the inner vessel, and the escape or overflow of the water takes place around the whole periphery of the vessel $b$.

When the pipe for feeding the dish-water is of about six-centimeter interior diameter, hardly any perceptible current is caused in the vessel $a$. The overflow of the water over the wall of the vessel $b$ takes place into a channel $c$, which is inclined so that all water is carried to the pipe $d$, which carries the same to the sewer-pipe or other exit.

As shown in the drawings, the admission of the dish-water takes place from the side, not from the top. Otherwise such fat as has a tendency to descend might be carried downward and even into the sewer when the dish-water flows in rather quickly. The dish-water is therefore admitted through the side, and it rises from a gradually-widening pipe $e$ in the center $f$ of the vessel $a$. Thus the fat is caused to rise not only by its less specific gravity, but also by the pressure of the head of water and the tendency of the water to rise when still warm. However, care must be taken that this admission through the side does not take place at too low a level, because then particles of fat could be carried away into the vessel $b$ and overflow into the exit-pipe. It is therefore advisable to admit the dish-water in the upper part of the vessel $a$, and regard must be had to the length of time within which the fat will be collected and to the amount of fat which will thus accumulate. For instance, if a cake of fat of from five to eight centimeters thickness is likely to be formed the admission may suitably take place from twelve to fifteen centimeters below the level $g$. In consequence of the admission of the dish-water, as described, the layer of fat is not disturbed. The fat can therefore congeal from the top and inclose the fine oils. The gradual widening of the admission-tube $e$ is designed to facilitate the passage of the drops of fat accumulating at $h$ during periods of non-operation through the tube to the vessel $a$. While the fat accumulates at the surface of the water in the vessel $a$ during the admission of dish-water into the vessel $a$, the solid particles contained in the latter descend and accumulate at the bottom, the current toward the overflow being weak.

A number of analyses have shown that this deposit at the bottom contains, after the water has been removed by draining or pressing, from three to ten per cent. of protein, four to nine per cent. of fat, and five to fifteen per cent. of extracts free of nitrogen, besides salts and spices of value particularly regarding digestive properties. This deposit can therefore be advantageously collected as food for animals—for instance, by the arrangement of a filter-plate $h'$ at a suitable part of the bottom of the vessel, as indicated in Fig. 3. Of course my apparatus is also applicable to the treatment of other liquids carrying fat for the removal and recovery of the latter.

What I claim, and desire to secure by Letters Patent of the United States, is—

1. In an apparatus for separating fats from liquids, the combination of an outer vessel, an inner vessel therein open at bottom, an overflow for the outer vessel below the top of the inner vessel, and an infeed-pipe leading laterally through the walls of both vessels and opening into the inner vessel below the water-level, substantially as described.

2. In an apparatus for separating fats from liquids, &c., the combination of an outer vessel, an overflow-channel at the upper end thereof, a cylindrical open-ended vessel within the outer vessel, but separated from the walls thereof and rising above the overflow-channel, an inlet-pipe opening into the inner vessel below the water-level therein, and an overflow-pipe from said channel, substantially as described.

3. In an apparatus for separating fats from liquids, the combination of the outer vessel having an annular overflow-channel around its top, and an overflow-pipe from said channel, a cylindrical vessel located within the outer vessel open at bottom and extending above the outer vessel, and an infeed-pipe arranged below the channel and passing laterally through both vessels and opening upwardly into the inner vessel below the water-level thereof, substantially as and for the purpose described.

In testimony whereof I have hereunto set my hand in the presence of two witnesses.

CHRISTOPH KREMER.

Witnesses:
JEAN GRUND,
CARL GRUND.